United States Patent
Erk

(10) Patent No.: US 8,763,064 B2
(45) Date of Patent: Jun. 24, 2014

(54) METHOD FOR CONTROLLING SET TOP BOXES AND SET TOP BOX THAT CAN BE CONTROLLED BY SAID METHOD

(75) Inventor: Alexander Erk, Poing (DE)

(73) Assignee: Institut Fuer Rundfunktechnik GmbH, Munich (DE)

( * ) Notice: Subject to any disclaimer, the term of this patent is extended or adjusted under 35 U.S.C. 154(b) by 863 days.

(21) Appl. No.: 12/523,613

(22) PCT Filed: Nov. 17, 2007

(86) PCT No.: PCT/EP2007/009950
§ 371 (c)(1),
(2), (4) Date: Jan. 20, 2010

(87) PCT Pub. No.: WO2008/086836
PCT Pub. Date: Jul. 24, 2008

(65) Prior Publication Data
US 2010/0146581 A1 Jun. 10, 2010

(30) Foreign Application Priority Data
Jan. 17, 2007 (DE) .................. 10 2007 002 513

(51) Int. Cl.
*H04N 7/173* (2011.01)
*H04N 7/16* (2011.01)

(52) U.S. Cl.
USPC ........... 725/132; 725/135; 725/136; 725/140; 725/152

(58) Field of Classification Search
None
See application file for complete search history.

(56) References Cited

U.S. PATENT DOCUMENTS 7,865,068 B2* 1/2011 Van Gestel et al. ............ 386/332
2008/0292277 A1* 11/2008 Gan et al. ....................... 386/124

(Continued)

FOREIGN PATENT DOCUMENTS

| WO | WO-2004/059973 A2 | 7/2004 |
| WO | WO-2004/098185 A1 | 11/2004 |
| WO | WO-2006/008675 A1 | 1/2006 |
| WO | WO-2006/085667 A1 | 8/2006 |

OTHER PUBLICATIONS

DVB; MHP specifications 1.1.2.*

(Continued)

*Primary Examiner* — Nasser Goodarzi
*Assistant Examiner* — Fred Peng
(74) *Attorney, Agent, or Firm* — Venable LLP; Robert Kinberg; Todd R. Farnsworth

(57) ABSTRACT

The aim of the invention is to indicate the availability of an update for an MHP application, which is modified only periodically, to the user of a set top box, while helping him or her to decide whether the modified update is actually required and optionally still maintaining the availability of the older update without restrictions. To achieve this, information concerning the scope and/or type of modification in relation to the older version is provided in the transmitted version number for the modified MHP application. The set top box starts the saved older version if special information exists ("launchable with older version" flag) and permits a comparison of the version number with the received version number of the modified MHP application as to whether the modifications of the modified MHP application are of such significance that the modified version must be received and saved in the cache memory. If an update of the cache memory is required, the user of the set top box receives an indication to switch to the narrow-band transponder channel and to receive the modified MHP application.

2 Claims, 1 Drawing Sheet

(56) References Cited

U.S. PATENT DOCUMENTS

2009/0228949 A1* 9/2009 Benjes et al. .................. 725/152
2009/0292761 A1* 11/2009 Lemmers et al. ............. 709/203
2009/0316796 A1* 12/2009 Taleb et al. .............. 375/240.25
2010/0146581 A1* 6/2010 Erk ................................ 725/152

OTHER PUBLICATIONS

International Search Report, issued in PCT/EP2007/009950 dated May 8, 2009.

Digital Video Broadcasting (DVB); Multimedia Home Platform (MHP) Specification 1.12.
Digital Video Broadcasting (DVB); Multimedia Home Platform (MHP) Specification 1.1.1.
"Digital Video Broadcasting (DVB); Multimedia Home Platform (MHP) Specification 1.1.1 European Broadcasting Union Union Européene de Radio-Télevision Ebuüer; ETSI TS 102 812" ETSI Standards, LIS, vol. BC, No. V1.2.2, 1 Aug. 1, 2006.

* cited by examiner

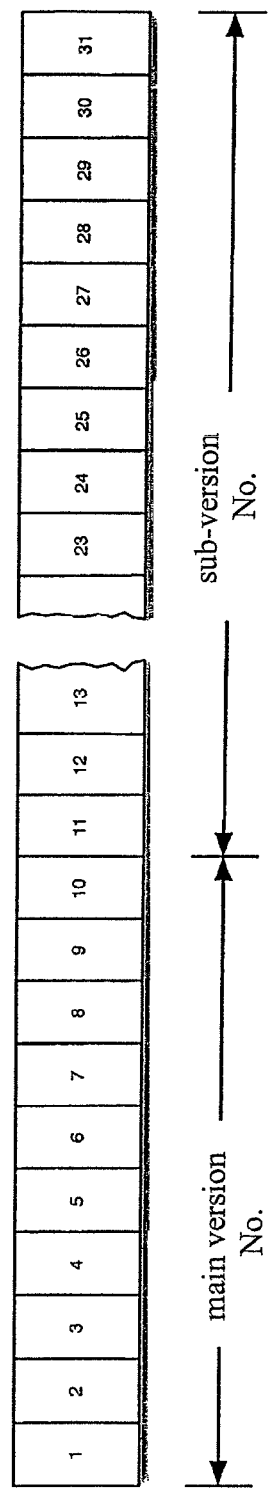

METHOD FOR CONTROLLING SET TOP BOXES AND SET TOP BOX THAT CAN BE CONTROLLED BY SAID METHOD

The invention relates to a method for controlling set top boxes as well as to a set top box that can be controlled by said method. A method of this type is known from the MHP 1.1.2 standard of the European Telecommunications Standards Institute (ETSI), which is published on the Internet home page for ETSI.

Satellite television channels, for example, are transmitted via different transponders to which a set top box can be tuned. Specifications such as the MHP (Multimedia Home Platform) standard, version 1.1.2 from ETSI, known as an interactive middleware software stack in the industry, describe a type of software that is loaded into set top boxes to receive and evaluate applications, among other things, which are transmitted as additional information into the data flow of digital television signals. MHP applications (used as an example of an interactive application throughout this specification), which are modified only occasionally on the transmitter or the provider side through an update and are therefore relatively non-variant or persistent, are transmitted on a joint narrow-band transponder channel at relatively slow speed to save channel capacity and are stored non-volatile in a cache memory of the set top box.

With the digital television signal associated with the persistent applications, a "non launchable from broadcast" flag is transmitted in an Application Information Table (abbreviated "AIT") to the set top box, which flag indicates that the respective persistent application must be started not from the received digital television signal, but from the cache memory. If the persistent application is updated, the version number of the modified application is also changed in the AIT table, thereby signaling to the set top box that an "older version" of the respective application is stored in its cache memory. In principle, the older application can thus no longer be started by the set top box, unless the AIT table contains a special "launchable with older version" flag that permits the release and/or the readout of the older MHP application.

The disadvantage of the known set top box control is that the modification of the application is not indicated to the user of the set top box. Only if the user by accident switches to the transponder channel for the narrow-band transmission of the application can the new version of the application be loaded and subsequently started.

An unpublished proposal by the BBC (British Broadcasting Corporation) calls for a so-called "launcher" to be transmitted in each transponder channel, which in general controls the application start and indicates to the user that an update of the associated persistent application is available. In the event that the user switches to the transponder channel for the narrow-band transmission of the persistent application, the "launcher" triggers the implementation of the update. With this proposed method, however, no application is available until the modified application is loaded onto the set top box, meaning also not the older version.

The disadvantage of this method is that a second application (launcher) must always be indicated and transmitted.

In contrast, it is the object of the present invention to specify a method for controlling a set top box, which indicates to the user the availability of an update, but which at the same time helps the user decide whether an update is actually needed, so that the older update is still available without restriction to the user.

This object is solved according to the invention with the features disclosed in patent claim 1.

An advantageous embodiment of the method according to the invention is disclosed in the dependent claim 2.

The dependent claim 3 seeks patent protection for a set top box that can be controlled with the method according to the invention.

The invention is explained in further detail in the drawing with the aid of an exemplary embodiment. The FIGURE shows the bit structure for a version number according to the invention which is intended for updating a persistent MHP application.

The version number for updating an MHP application, shown schematically in the drawing, is transmitted in the AIT table of the transponder channel that is assigned to the application. The version number consists of a 31-bit sequence, of which the bits No. 1 to 10 identify the primary version numbers and the bits No. 11 to 31 identify the secondary version numbers. With the division into primary version number and secondary version number, it is possible to indicate to the user and thus also to the MHP application the type and scope of an implemented modification of the associated MHP application.

The previously mentioned "launchable with older version" flag is furthermore transmitted as special information in the AIT table of the digital television signal. This flag permits the start of an older version of the MHP application, stored in a cache memory of the set top box, despite the fact that the modified persistent MHP application has already been transmitted via the associated transponder channel and despite the therewith connected signaling of a modified version number in the AIT table.

According to the invention, the modified version number and the older version number are compared in the set top box to determine whether the primary version number or only the secondary version number was modified. For this comparison the older, stored version of the application is started and is used to compare its own (older) version number to the new version number indicated in the AIT table. If the comparison shows that the primary version number has changed, then this change in the primary version number indicates a substantial change with respect to type and scope to the user, which requires the implementation of an update of the respective MHP application. Following the signaling of this change, it is up to the user of the set top box to tune the set top box to the special narrow-band transponder channel for transmitting the changed MHP application. If the user decides not to switch over, the user has the option to use the older version of the application without restrictions since the special "launchable with older version" flag permits the startup of the stored, older version.

However, if a comparison of the version numbers only detects a change in the secondary version number, it indicates that the implementation of an update of the respective MHP application is not absolutely necessary, based on the type and scope of the modification.

The invention claimed is:

1. A method for controlling set top boxes with an interactive middleware software stack loaded onto them, wherein the set top box can be tuned to digital television signals transmitted by different transponders, wherein furthermore the transmitted digital television signals contain an application information table (AIT) on available interactive applications, of which relatively non-variant (persistent) applications are transmitted at slow speed via a narrow-band transponder channel and are stored in a cache memory of the set top box under an individual version number, wherein the AIT table furthermore contains an information ("non launchable from broadcast" flag) which signals to the set top box that an interactive application identified by its version number should not be started from the received digital television signal, but from the cache memory, wherein furthermore in the case of a modification (update) of the interactive application, the version number of the respective interactive application in the transmitted AIT table is changed, thereby indicating to the set top box that an "older version" of the interactive application is stored in its cache memory which is no longer started unless the AIT table contains a special information ("launchable with older version" flag) that permits the readout of the stored, older interactive application, characterized in that the transmitted version number for the modified interactive application contains at least one of an information on the scope and the type of the modification, as compared to the older version, that the set top box starts the stored, older version if the special information "launchable with older version" flag is present and thus enables the stored older interactive application to compare the version numbers, so as to determine whether the changes made in the modified interactive application require that the modified version must be received and stored in the cache memory, wherein the user of the set top box is given the signal to switch to the narrowband transponder channel and receive the modified interactive application if an update of the cache memory is required and further characterized in that the version number of the stored older interactive application and the modified interactive application is divided into a first bit sequence and a second bit sequence to provide at least one of the information on the scope and/or type of change, wherein the first bit sequence identifies a primary version number and the second bit sequence identifies a secondary version number, wherein during the comparison between the changed version number and the older version number, the necessity for implementing an update of the stored older interactive application is indicated only if a change is detected by the set top box in the primary version number of the modified interactive application, wherein the modified interactive application is ignored if a change is detected by the set top box only in the secondary version number.

2. A set top box controlled according to the method according to claim 1.

* * * * *